(12) United States Patent
Wecker et al.

(10) Patent No.: US 12,372,125 B2
(45) Date of Patent: Jul. 29, 2025

(54) DISC BRAKE ARRANGEMENT COMPRISING POSITIONING DEVICE

(71) Applicant: ZF Active Safety GmbH, Koblenz (DE)

(72) Inventors: Paul Wecker, Limburg (DE); Marco Becker, Oberduerenbach (DE); Peter Maeurer, Koblenz (DE); Lukas Madzgalla, Lahnstein (DE); Florian Roessinger, Neuwied (DE)

(73) Assignee: ZF Active Safety GmbH, Koblenz (DE)

( * ) Notice: Subject to any disclaimer, the term of this patent is extended or adjusted under 35 U.S.C. 154(b) by 410 days.

(21) Appl. No.: 17/883,121

(22) Filed: Aug. 8, 2022

(65) Prior Publication Data
US 2023/0058671 A1 Feb. 23, 2023

(30) Foreign Application Priority Data
Aug. 18, 2021 (DE) .......................... 102021209047.8

(51) Int. Cl.
*F16D 55/227* (2006.01)
*F16D 65/00* (2006.01)
(Continued)

(52) U.S. Cl.
CPC ....... *F16D 55/227* (2013.01); *F16D 65/0056* (2013.01); *F16D 65/0087* (2013.01);
(Continued)

(58) Field of Classification Search
CPC .............................. F16D 65/0087; F16D 65/52
See application file for complete search history.

(56) References Cited

U.S. PATENT DOCUMENTS
2004/0195056 A1  10/2004  Ashman et al.

FOREIGN PATENT DOCUMENTS
DE  102012102584 A1 *  9/2013  ........... F16D 55/226
DE  102013207424 A1 * 10/2014  ......... F16D 65/0978
(Continued)

*Primary Examiner* — Melody M Burch
(74) *Attorney, Agent, or Firm* — Kristin L. Murphy

(57) ABSTRACT

The present disclosure relates to a disc brake arrangement comprising,
a brake carrier, at least one brake lining, and at least one positioning device. The brake carrier comprises a brake disc shaft, comprising at least one outer face which is a side remote from the brake disc shaft, comprising at least one inner face which is a side facing the brake disc shaft, and comprising guide grooves which run in each case from the outer face to the inner face, the direction thereof defining an actuating direction, and which are formed in each case from two opposing guide surfaces and a support surface connecting the guide surfaces. The at least one brake lining comprises a friction lining and a lining carrier which is displaceably mounted by guide ears in the guide grooves in the actuating direction. The at least one positioning device comprises a guide and comprises a clamping device, the brake lining and the brake carrier being coupled thereby so as to be displaceable relative to one another. The clamping device has at least one protruding, elastically-acting clamping element which, due to the elastic deformation in an operating configuration of the positioning device, brings about both a frictional connection between the clamping device and the guide, which permits a wear adjustment and generates a restoring force when an actuating force is applied to the positioning device. The disclosure further relates to a mounting method for mounting a positioning device in the disc brake arrangement.

18 Claims, 7 Drawing Sheets

(51) Int. Cl.
  *F16D 65/097* (2006.01)
  *F16D 65/52* (2006.01)
  *F16D 55/00* (2006.01)

(52) U.S. Cl.
  CPC ......... *F16D 65/0978* (2013.01); *F16D 65/52* (2013.01); *F16D 2055/0008* (2013.01)

(56) References Cited

FOREIGN PATENT DOCUMENTS

| | | | |
|---|---|---|---|
| DE | 102013016779 A1 * | 4/2015 | ......... F16D 65/0056 |
| DE | 102019205500 A1 | 10/2020 | |
| WO | 2012111829 A1 | 8/2012 | |
| WO | WO-2017090643 A1 * | 6/2017 | .............. B60T 1/065 |

* cited by examiner section D-D section E-E

DISC BRAKE ARRANGEMENT COMPRISING POSITIONING DEVICE

CROSS-REFERENCE TO RELATED APPLICATION

This application claims priority to German Priority Application No. 102021209047.8, filed Aug. 18, 2021, the disclosure of which is incorporated herein by reference in its entirety.

TECHNICAL FIELD

The disclosure relates to a disc brake arrangement of a disc brake for a motor vehicle comprising a positioning device for restoring a brake lining and for positioning said brake lining for the purpose of wear adjustment. The disclosure further relates to a mounting method for mounting such a positioning device in the disc brake arrangement.

BACKGROUND

In motor vehicles it is increasingly important to save energy. In brake systems, in particular disc brakes, brake linings which abrade against a brake disc in the case of a non-actuated braking function without the application of pressure, lead to an undesirable braking force. Furthermore, fine dust is generated by the abrasion of the brake linings. In order to eliminate such drawbacks, restoring devices are already known in the prior art. These restoring devices restore the brake linings into a resting position after an actuating process. The restoring is generally carried out by a restoring force, wherein by the restoring into the resting position an air gap is provided between the brake lining and a brake disc. The air gap permits a contactless rotation of the brake disc relative to the brake lining which is also frictionless and free of fine dust. A wear compensating mechanism may also be provided in addition to such restoring devices, said wear compensating mechanism monitoring the resting position, even in the case of increasing wear on the brake linings, such that the air gap always remains the same in the non-actuated state of the braking device. Such devices are also known in the prior art. DE 10 2013 016 779 A1, DE 10 2019 210 316 A1, US 2004/0195056 A1 and DE 10 2019 205 500 A1 disclose such restoring devices with a wear compensation function.

SUMMARY

What is needed is a disc brake arrangement of the type mentioned in the introduction in which the function of the brake lining positioning, comprising restoring and wear adjustment, is achieved with a solution which is cost-effective, compact, easily mountable and reliable. A suitable mounting method for mounting a positioning device according to the disclosure in such a disc brake arrangement is also needed.

The disc brake arrangement according to the disclosure comprises a brake carrier, at least one brake lining and at least one positioning device. The brake carrier comprises a brake disc shaft, at least one outer face which is a side remote from the brake disc shaft, at least one inner face which is a side facing the brake disc shaft, and guide grooves which run in each case from the outer face to the inner face, the direction thereof defining an actuating direction B, and which are formed in each case from two opposing guide surfaces and a support surface connecting the guide surfaces. The guide grooves thus form in each case a C-shaped guide shaft. The at least one brake lining comprises a friction lining and a lining carrier which is displaceably mounted by guide ears in the guide grooves in the actuating direction. The at least one positioning device comprises a guide and a clamping device. The guide and the clamping device are operatively connected together such that the brake lining and the brake carrier are coupled by this operative connection so as to be displaceable relative to one another. The clamping device has at least one protruding, elastically-acting clamping element which, due to the elastic deformation in an operating configuration of the positioning device, brings about both a frictional connection between the clamping device and the guide, which permits a wear adjustment and generates a restoring force when an actuating force is applied to the positioning device.

The implementation of both functions, both the function of the wear adjustment and the function of the restoring, by the at least one clamping element produces a compact design of the clamping device and this leads to the desired functions being achieved with fewer structural elements. A flexible variation of the dimensioning and thus an optimal adjustment of the restoring forces and the frictional forces according to the application is possible due to the protruding shape.

In the following paragraph, the mode of operation of the brake lining restoring and the wear adjustment is described purely for the sake of clearer understanding as if the disc brake arrangement were installed in an operational disc brake. The protected scope of the subject specified in the claims is not limited thereby.

The restoring of the brake lining takes place by the clamping element being elastically deflected, when the brake lining is moved with an actuation of the disc brake, by the frictional connection which acts between the pretensioned clamping element and the guide. With the withdrawal of the braking force, i.e. when a driver takes the pressure off the brake pedal again, the at least one clamping element pulls back the brake lining over the actuating path previously covered. This actuating path corresponds to the bridging of an air clearance between the brake lining and the brake disc, and optionally a further adjustment due to the adjusting force and the elastic material deformations associated therewith in the disc brake. With the occurrence of wear on the friction lining or on the brake disc, the actuating path is sufficiently great that the deflection clearance of the at least one clamping element and also the static friction force of the frictional connection between the clamping element and the guide are exceeded. In this case, the guide slips through the clamping device according to the degree of wear, and a wear adjustment is brought about.

In one exemplary arrangement, the clamping device is designed as a sheet metal structure, wherein the at least one clamping element comprises an elastically deflectable sheet metal portion, for example, a cut-out elastically deflectable sheet metal portion, or is designed as such. Such a sheet metal portion is provided when a sheet metal portion is cut out from a metal sheet such that it is elastically deflectable, without the sheet metal region (base plate) surrounding the cut-out sheet metal portion also being deformed or deflected. Such an elastically deflectable sheet metal portion may also be described as a spring leg which may be elastically moved at least partially independently of the metal sheet which surrounds it.

In one exemplary arrangement, a sheet metal portion is designed as a folded sheet metal portion. The spring leg in this case protrudes at an angle from the metal sheet which surrounds it.

In a further exemplary arrangement, the sheet metal structure is configured in one piece. In this case, the sheet metal structure ideally has a continuous sheet metal thickness t. This results when the one-piece sheet metal structure is originally produced from a single sheet metal blank by bending and, for example, by stamping and/or lasering. The one-piece design reduces the number of parts which have to be mounted, and it is robust.

In one exemplary arrangement, the folded edge of the folded sheet metal portion relative to the base plate, from which the folded sheet metal portion is bent out, has a folding angle α ranging from 20° to 70°, in a further exemplary arrangement ranging from 30° to 60°. The neutral axis of the folded edge has a length x, measured from the transition from the base plate to the folded region as far as the free end of the protruding clamping element. In other words, the protruding elastically-acting clamping element which is configured as the folded sheet metal portion represents a spring leg or clamping leg. The orientation and the length of this spring leg are specified by the above details. A base plate is to be understood to mean a sheet metal portion with a planar extent which represents the immediate surroundings of the folded sheet metal portion.

In one exemplary arrangement, the measurement of the length x is at least equal to the measurement of the sheet metal thickness t and a maximum of 4 times the size of the measurement of the sheet metal thickness t. In a further exemplary arrangement, the measurement of the length x is at least equal to the measurement of the sheet metal thickness t and a maximum of 3 times the size of the measurement of the sheet metal thickness t. This results in a high spring stiffness of the folded sheet metal portion and high spring forces and thus correspondingly high restoring forces are achieved.

In one exemplary arrangement of the disclosure is when the guide has a guide rod and a bearing region, the guide bearing or being supported thereby on the brake carrier. In one exemplary arrangement, the support is implemented via a joint and in one exemplary arrangement via a ball joint or a rotary joint. Joints of simple design are also encompassed by such joints. In a simple arrangement, such a rotary joint may be a bearing rod which bears against an upper surface, for example against the outer face of the brake carrier, and which is pivotable about its longitudinal axis and rolls on the surface or pivots on the surface about a bearing point and/or a pivot point. The positioning device may be adapted by such joints to changing orientations of the guide during the operation of the brake, due to movements of the brake lining in the direction of the support surface of the guide groove or away from the support surface (i.e. transversely to the actuating direction B) or may compensate for corresponding rocking movements. Moreover, such a joint or such joints may compensate for production-related or construction-related unevenness of the outer face of the brake carrier and/or different angular positions of the outer face relative to the actuating direction, i.e. relative to the orientation of the guide groove, and ensure a simple mounting and a secure bearing of the bearing region of the guide against the outer face of the brake carrier.

In one exemplary arrangement, the at least one clamping element may have a straight edge, the at least one clamping element bearing thereby against the guide rod in the operating configuration. The straight edge permits different angular positions of the guide rod, without undesirable stresses occurring in the clamping element or in the guide rod or undesirable changes to the force ratios occurring between the clamping element and guide rod. Thus no particular measures have to be taken if the outer face of the brake carrier is not oriented exactly at right-angles to the actuating direction, for example due to a casting bevel and/or if the guide rod does not run exactly parallel to the actuating direction. The straight edge, which forms a punctiform or linear contact with the guide rod, compensates for corresponding oblique positions of the guide rod which promotes the operational reliability and the ease of mounting.

In one exemplary arrangement, the straight edge forms the end of the at least one protruding, elastically-acting clamping element, and in one exemplary arrangement of the folded sheet metal portion of the at least one clamping element.

In one exemplary arrangement, the clamping element has an orientation or is designed in such a manner that the straight edge runs oriented at an angle which is greater than 60° and less than 120° to the actuating direction. In one exemplary arrangement, the straight edge runs at right-angles to the actuating direction. As a result, it is possible to compensate for very different oblique positions of the guide rod.

A suitable exemplary arrangement of the disclosure is when the clamping device is connected to a guide ear of the lining carrier in such a manner that the position of the clamping device is fixed relative to the corresponding guide ear. It is advantageous here if the lining carrier has an opening and even more advantageous if the guide ear has an opening or the guide ears have in each case an opening through which the guide rod penetrates or may penetrate.

In possible exemplary arrangement, the clamping device may be connected by a material connection to the lining carrier, for example to the guide ear, such as for example by welding, primarily by spot welding and/or by a positive connection, such as for example by folded edges, tabs, beads, rivets or screws.

In one exemplary arrangement, the guide rod has at least one planar contact surface, the straight edge of the folded sheet metal portion of the at least one clamping element bearing thereagainst and forming therewith a linear contact. In this manner, the above-described compensation effect is maintained (oblique positions of the guide rod). The linear contact, however, also results in a more reliable and longer-lived operative connection and force transmission between the clamping element and the guide.

In one exemplary arrangement, the at least one clamping element is a first clamping element and if the clamping device comprises a second clamping element which has the same aforementioned features as the first clamping element and fulfils the same functions as the first clamping element. The aforementioned features may be present in the second clamping element in combination or selectively, as in the first clamping element. The two clamping elements form together a through-passage for the guide rod. In this case, the cross section of the guide rod is designed such that in the operating configuration of the positioning device the guide rod elastically pretensions the clamping elements in a first rotational orientation about its longitudinal axis, and in a first mounting configuration of the positioning device the guide rod does not pretension the clamping elements or to a lesser extent in a second rotational orientation about its longitudinal axis, in comparison with the operating configuration with the first rotational orientation. The two clamping elements of the clamping device are thus opposingly arranged such that they form a through-passage having a specific through-passage width. In the operating configuration which corresponds to a state in which the disc brake arrangement, or a disc brake in which the disc brake arrangement may be a constituent part, is ready for use, the guide rod of the guide protrudes through the through-passage of the clamping device and forces apart the clamping elements, so that these clamping elements exert a force on the guide rod. To this end, however, the guide rod has to have a specific "first" rotational orientation. The cross section of the guide rod is designed such that in this first rotational orientation the cross section of the guide rod has a greater extent than the through-passage width of the through-passage and thus forces apart the clamping elements. This results in the required frictional connection for the restoring function and the function of the wear adjustment. The second rotational orientation of the guide rod, which takes effect in a first mounting configuration, aligns the guide rod such that its cross section does not force apart the clamping elements or to a lesser extent, so that an assembly of the guide and clamping device is possible.

The guide rod may further have a constriction in the transition region to the bearing region, whereby in a second mounting configuration in which the clamping elements protrude into the constriction, the guide rod does not pretension the clamping elements or to a lesser extent in comparison with the operating configuration, irrespective of its rotational orientation about its longitudinal axis. This exemplary arrangement also serves for a simple assembly of the guide and clamping device.

In one exemplary arrangement, the guide rod has a rectangular cross section with short rectangular edges and long rectangular edges. In this case, the two short rectangular edges a form in each case the above-described planar contact surface. In the operating configuration in which the first rotational orientation of the guide rod is present, the first and the second clamping element bear in each case against one of the short rectangular edges.

In one possible exemplary arrangement of a ball joint-like bearing of the bearing region against the outer face of the brake carrier, the bearing region has a head with an at least partially spherical bearing surface. In this case, the head is mounted in a receiver of a bearing disc which is shaped so as to correspond to the at least partially spherical bearing surface, and the bearing disc bears against the outer face of the brake carrier. Oblique positions of the guide rod may be compensated in every direction by these bearings. As already described above, such oblique positions may be present due to the nature of the outer face and/or the orientation thereof relative to the actuating direction or by movements of the brake lining transversely to the actuating direction. The compensation takes place in the ball joint, whilst with each deflection of the guide rod the bearing disc bears in a permanently stable manner against the outer face of the brake carrier.

In one exemplary arrangement of a rotary joint-like bearing of the bearing region against the outer face of the brake carrier, the bearing region is configured as a bearing rod, for example with a round cross section. In this case, the bearing rod adjoins one end of the guide rod and forms a T-shape therewith, and in one exemplary arrangement, in one piece. In the case that the guide rod has a rectangular cross section, the bearing rod is oriented parallel to the short rectangular edges a of the guide rod.

In the operating configuration, the bearing rod may also bear against the outer face of the brake carrier, oriented at an angle of 0° to 30° to the support surface. An orientation of 0° might accordingly be a parallel orientation to the support surface. This provides the advantage, in particular with a C-shaped guide groove, that the bearing rod may be effectively supported against the outer face of the brake carrier.

The design with a bearing rod, in particular the one-piece design, has the advantage that it is robust, that the mounting is simple due to the few parts to be mounted and that it also may compensate for all oblique positions of the guide rod. Firstly, due to the rotary joint function, it is possible to compensate for brake lining movements which take place transversely to the actuating direction. The bearing rod then rolls over the outer face of the brake carrier or pivots there about a pivot point. However, a stable position of the guide also results by the bearing rod being supported on the outer face of the brake carrier substantially on only two bearing points, and it is also possible to compensate for unevenness of the outer face or an oblique outer face. If the outer face does not run at right-angles to the actuating direction, the bearing rod bears against two points on the outer face and the guide rod then moves into an oblique position. This oblique position is compensated in turn by the coupling with the clamping device, in particular by means of the straight edges of the clamping elements.

In an alternative exemplary arrangement in conjunction with the ball joint receiver, however, it is also possible to provide rounded bearing edges on the clamping elements. In this case, the guide rod has a circular profile. In one exemplary arrangement, the clamping elements are configured as clamping limbs located in the plane of the base plate. The advantage of this solution is that the clamping device may be produced with fewer folded edges. In this exemplary arrangement, the positioning device also provides an effective compensation function in cooperation with the ball joint receiver in different orientations of the guide rod.

The mounting method according to the disclosure for mounting a positioning device in a disc brake comprises the following steps. In this case, it is assumed that the disc brake and the positioning device are designed according to the above description but that the clamping device is provided at least with the two clamping elements and that the guide is a guide rod provided with a rectangular cross section and the constriction. The mounting steps are as follows:
   a) orientating the guide with the free end of the guide rod in the direction of the outer face of the brake carrier and such that the long rectangular edges of the guide rod are oriented parallel to the support surface of one of the guide grooves,
   b) inserting the guide rod from the outer face in the direction of the inner face of the brake carrier through the through-passage of the clamping device until the constriction comes to rest in the region of the through-passage,
   c) rotating the guide about the guide rod longitudinal axis such that the short rectangular sides a of the guide rod are oriented parallel to the support surface of the same guide groove,
   d) and/or e),
   wherein at d) the guide is pulled out counter to the previous insertion direction until the clamping elements are pretensioned by bearing against the short rectangular edges, and
   wherein at e) the brake is actuated for positioning the brake lining into an operating position, and the bearing region of the positioning device is brought to bear against the brake carrier.

In step a) and b) the rotational orientation of the guide rod corresponds to the second rotational orientation.

In step d) and e) the rotational orientation of the guide rod corresponds to the first rotational orientation.

BRIEF DESCRIPTION OF DRAWINGS

The disclosure is described in more detail hereinafter with reference to the accompanying schematic figures. In this case, it is the description of an exemplary arrangement and an alternative arrangement of the disclosure. Moreover, the mounting method according to the disclosure is described by way of example. For the sake of clarity, not all of the elements shown in a figure are always provided with a reference numeral. Corresponding elements or regions are thus identified at least in a different figure and the meaning may be derived therefrom.

DETAILED DESCRIPTION

In a first exemplary arrangement of the disc brake arrangement 1 according to the disclosure, a brake lining 20 is displaceably mounted in a brake carrier 2 in an actuating direction B.

Figure 1:
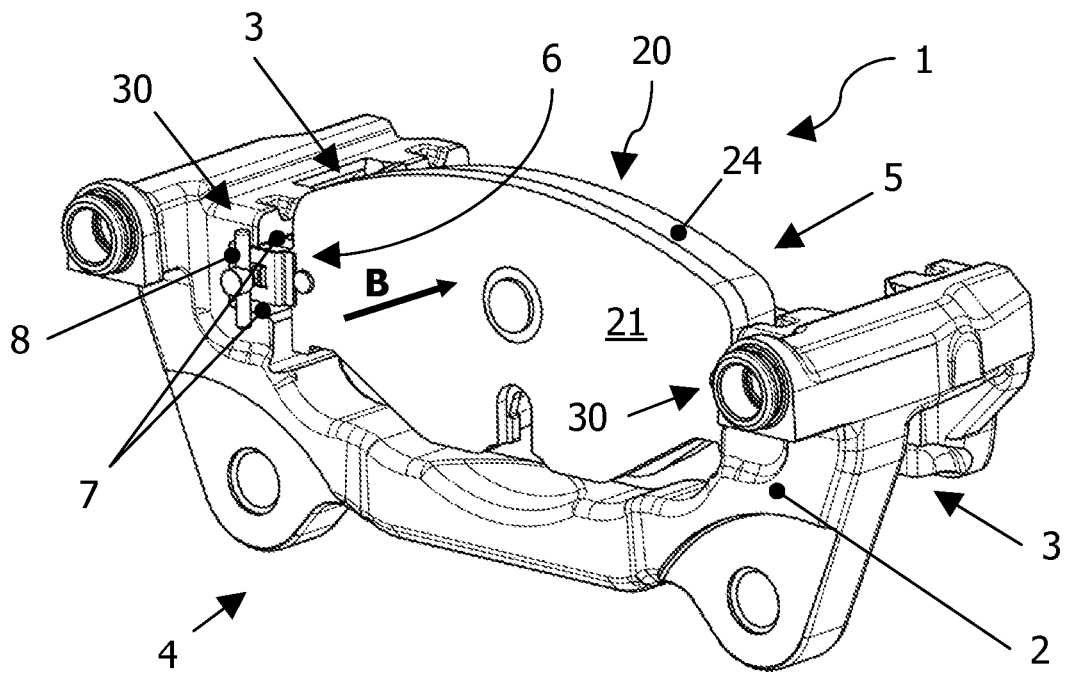
FIG. 1 shows the disc brake arrangement in perspective view.

FIG. 1 illustrates the basic construction of the disc brake arrangement 1. The disc brake arrangement 1 represents a partial region of a disc brake for a motor vehicle. A bearing of the brake lining 20 is implemented by two guide grooves 6 which are incorporated in the brake carrier 2. The guide grooves 6 extend in each case from an outer face 4 of the brake carrier 2 to an inner face 5. A path of the guide grooves 6 defines in this case an actuating direction B which corresponds to the adjusting direction in the event of a brake actuation of the brake lining 20 in the guide grooves 6. A brake disc shaft 3 is located in the interior of the brake carrier 2. The inner face 5 is a defining side of the brake disc shaft 3. The outer face 4 defines the brake carrier 2 outwardly and is a side remote from the brake disc shaft 3.

The guide grooves 6 in each case are formed from two opposing guide surfaces 7 and a support surface 8 connecting the guide surfaces 7. The guide grooves 6 thus form in each case a C-shaped guide shaft. The brake lining 20 has a friction lining 24 and a lining carrier 21 which is displaceably mounted by guide ears 22 in the guide grooves 6 in the actuating direction B.

The brake lining 20 and the brake carrier 2 are coupled so as to be displaceable relative to one another via two positioning devices 30. The positioning devices 30 have to this end in each case a guide 60 and a clamping device 40 which are operatively connected together. The clamping devices 40 are sheet metal boxes which are configured in one piece and positioned in each case on the guide ears 22. These sheet metal boxes or sheet metal structures in each case originate from a corresponding sheet metal blank which has a sheet metal thickness t and which has been lasered or stamped and provided with corresponding bends.

The positioning device 30 is described hereinafter mainly in the singular, since both positioning devices 30 are identical.

Figure 2:
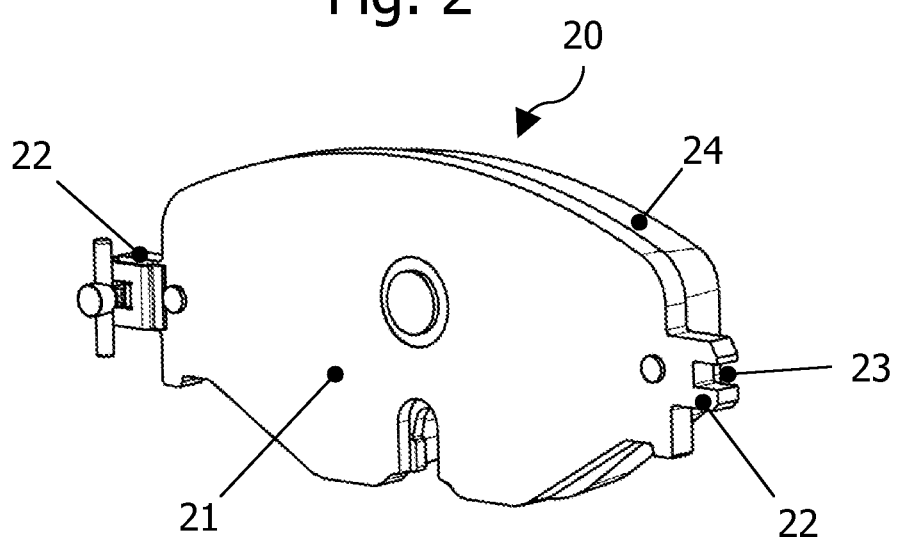
FIGS. 2 and 3 show a part of the disc brake arrangement in perspective view.

As may be seen in FIG. 2 and the following figures, the clamping device 40 clamps the respective guide ear 22, which in each case is provided with an opening 23. On the side on which the friction lining 24 (=friction lining side of the lining carrier 21) is arranged, the clamping device 40 has a folded-over edge 47 which is supported on the guide ear 22. On the opposing side of the lining carrier 21 (=rear face of the lining carrier 21) the clamping device 40 is supported on the outer end of the guide ear 22 with a bead 48 on the guide ear 22 and where the guide ear 22 transitions into the main part of the lining carrier 21, the clamping device 40 is supported with an angled support 49 on the rear face of the lining carrier 21. Moreover, the angled support 49 abuts against a raised portion which protrudes from the rear face of the lining carrier 21. The folded-over edge 47 and the side of the clamping device 40 which has the bead 48 and the angled support 49, are connected to a connecting web which bears against the front face of the guide ear 22. The clamping device 40 is fixed to the respective guide ear 22 by the aforementioned support or bearing. Two folded and elastically deflectable sheet metal portions 42, 42', which are spaced-apart from one another and which are cut out of the corresponding sheet metal region (base plate) 46, form a through-passage 45 on the rear face of the lining carrier 21. This through-passage, which is arranged so as to be congruent with the opening 23 in the respective guide ear 22, is identified in FIGS. 5 and 7. The sheet metal portions 42, 42' represent clamping elements 41, 41' which in each case with a straight clamping edge 44 elastically clamp a guide rod 61 which is a constituent part of the guide 60. The folded edge of the folded sheet metal portion 42, 42' has a folding angle α of ca. 45° relative to the base plate 46 from which the folded sheet metal portion 42, 42' has been bent out. The neutral axis of the folded edge has a length x, measured from the transition from the base plate 46 into the folded region up to the free end of the protruding clamping element 41, 41'. The measurement x is approximately twice the size of the measurement t. By such relatively small spring legs, a high spring stiffness of the folded sheet metal portion 42, 42' is achieved and high spring forces and thus correspondingly high restoring forces are achieved. The measurement x is recorded in FIG. 10.

The guide 60 is shown, for example, in FIGS. 4 to 8. The guide 60 has a guide rod 61 and a bearing region 64 which is configured as bearing rod 71 with a round profile. The bearing rod 71 is arranged at right-angles at one end of the guide rod 61. Both parts are connected integrally together and form a T-shape, wherein the guide rod 61 forms the vertical part and the bearing rod 71 the bar of the T-shape. The guide 60 is supported on the brake carrier 2 by the bearing rod 71.

Figure 3:
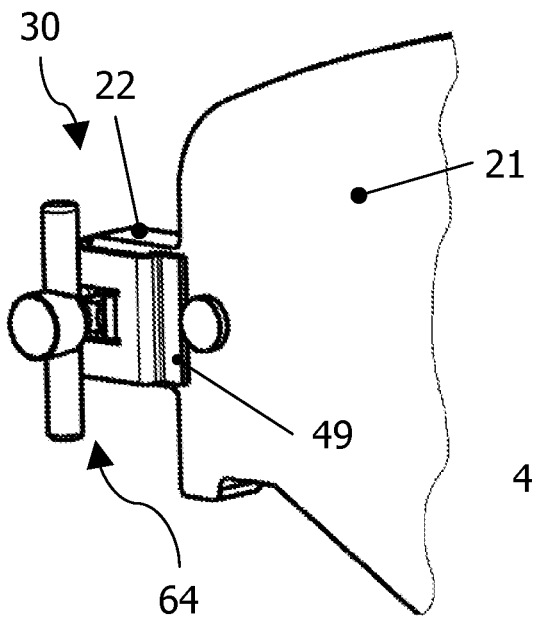

FIG. 3 shows a part of the disc brake arrangement 1 in an operating configuration with a first rotational orientation DO1 of the guide 60 or the guide rod 61 relative to its longitudinal axis, when it is considered as a rotational axis. Such an operating configuration is present when the disc brake arrangement 1 is installed in a disc brake of a motor vehicle so as to be ready for operation. In this first rotational orientation DO1 the bearing rod 71 is oriented such that a support may be brought about on the brake carrier 2. In other words, the recess in the outer face 4 of the brake carrier as a result of the guide groove 6 is spanned by the bearing rod 71. As the bearing rod 71 has a round cross section, it bears in a linear manner against the outer face 4 of the brake carrier 2 and in this manner forms a type of rotary bearing. As a result, the guide 60 may permit pivoting movements of the guide 60 and in particular of the guide rod 61 without the bearing rod 71 losing contact with the brake carrier 2. The freedom of movement of the guide 60 due to the design of the guide rod 61 is illustrated in FIGS. 9 and 10.

Figure 5:
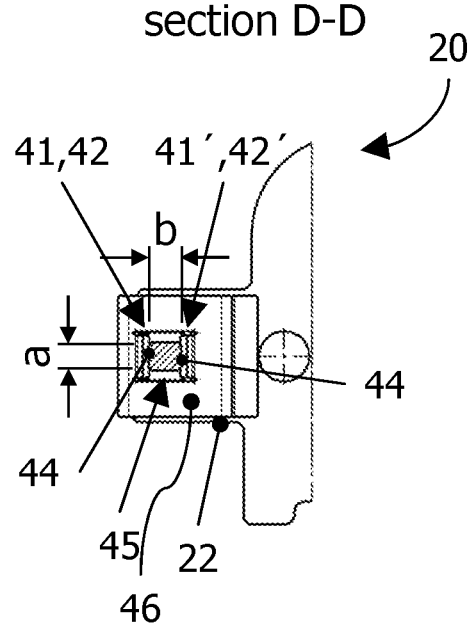
FIG. 5 shows the section D-D which is identified in FIG. 4.
Figure 4:
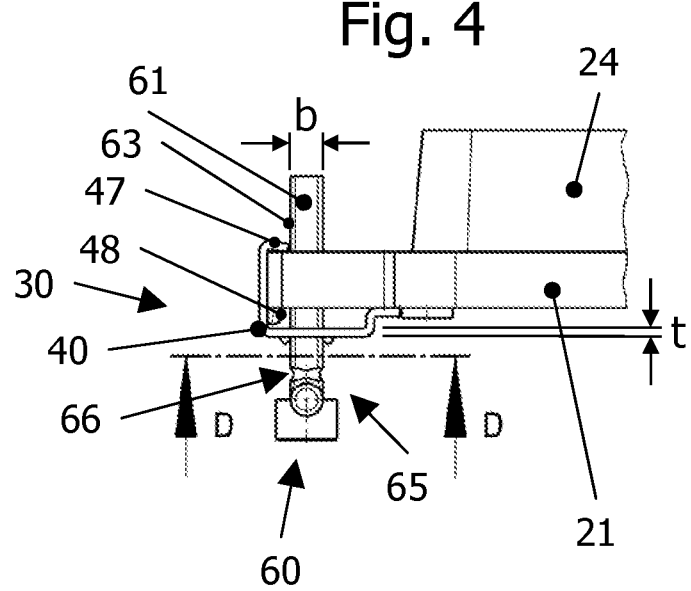
FIG. 4 shows the positioning device in a projected view.
Figure 6:
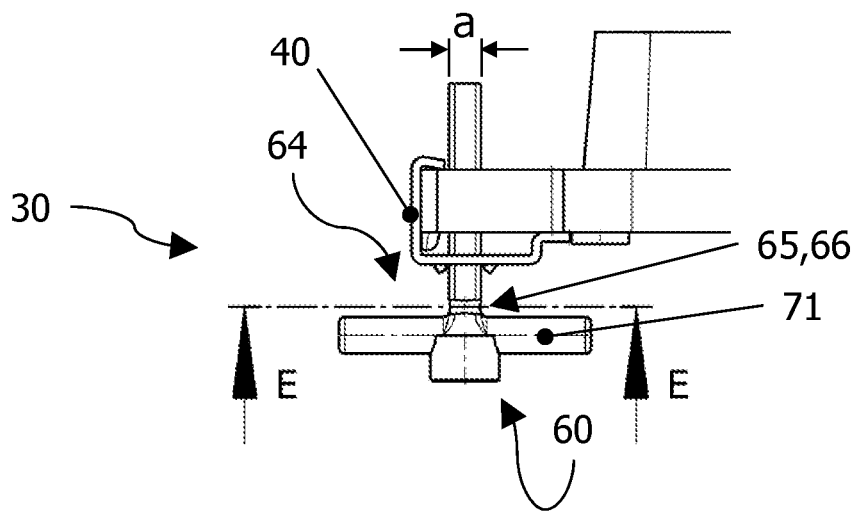
FIG. 6 shows the positioning device in a projected view.

The design of the guide rod 61 is shown in FIGS. 4 to 6. The guide rod 61 has a rectangular cross section with short rectangular edges a and long rectangular edges b. The short rectangular edges a run parallel to the bearing rod 71. The short rectangular edges a also form planar contact surfaces 63, the clamping elements 41, 41' bearing thereagainst in each case with their straight clamping edge 44 in the operating configuration and in the case of the first rotational orientation DO1 of the guide rod. The clamping elements 41, 41' thus press elastically against the contact surfaces 63 and clamp the guide rod 61. This results in a frictional connection between the clamping device 40 or the clamping elements 41, 41' and the guide 60 or the guide rod 61. The mode of operation of this frictional connection in conjunction with the protruding clamping elements 41, 41' or the elastically deflectable and folded sheet metal portions 42, 42' has already been described above in the general part of the description.

Figure 7:
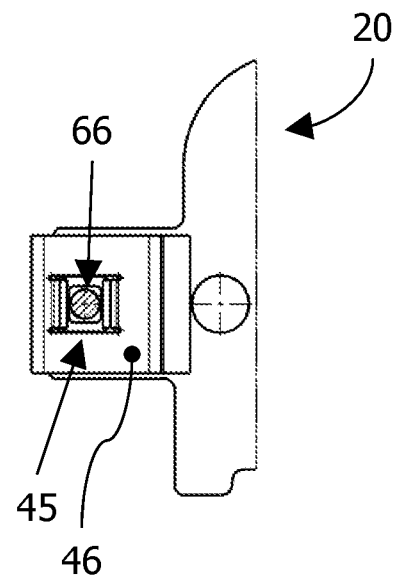
FIG. 7 shows the section E-E which is identified in FIG. 6.
Figure 8:
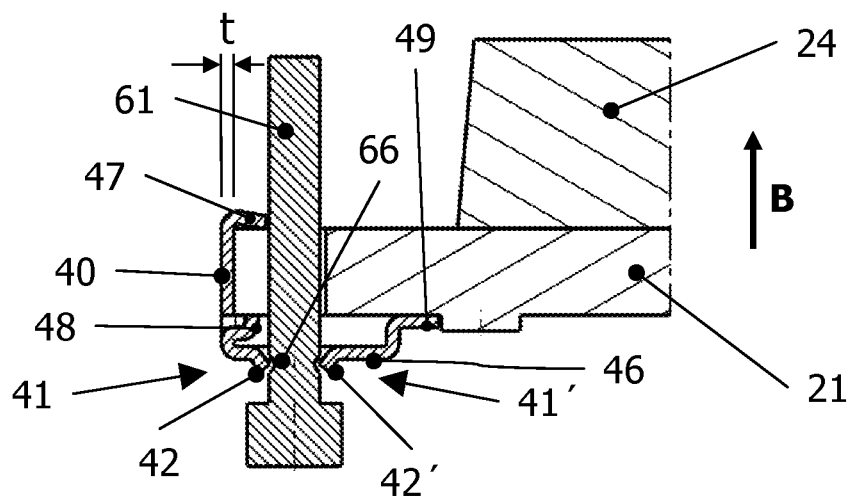
FIG. 8 shows the positioning device in a sectional view.

In FIGS. 6 to 8 it may be seen that the guide rod 61 has a constriction 66 in the transition region 65 to the bearing rod 71. FIGS. 6 and 7 show the positioning device 30 in a first mounting configuration and FIG. 8 shows the positioning device 30 in a second mounting configuration. The different mounting configurations are described further at a later point within the context of the description of the mounting method.

Figure 9:
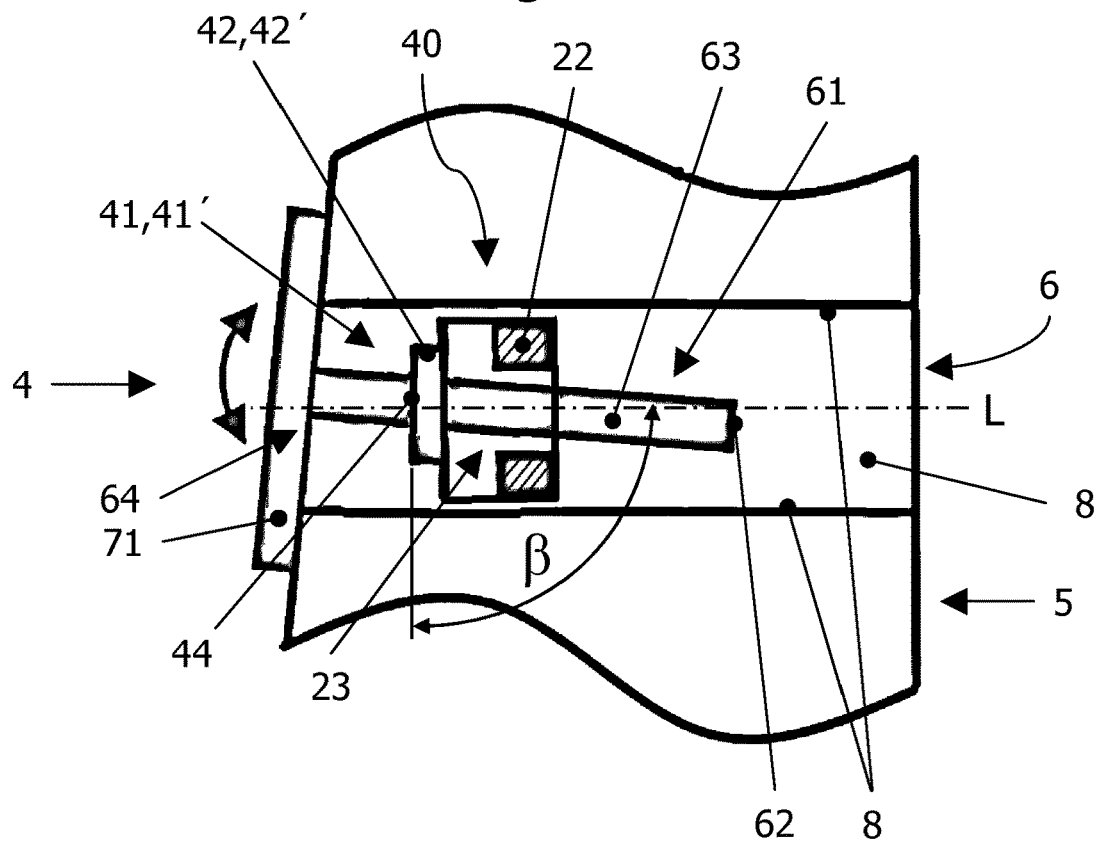
FIGS. 9 and 10 show the guide groove and the positioning device in a particularly highly schematic manner.
Figure 10:
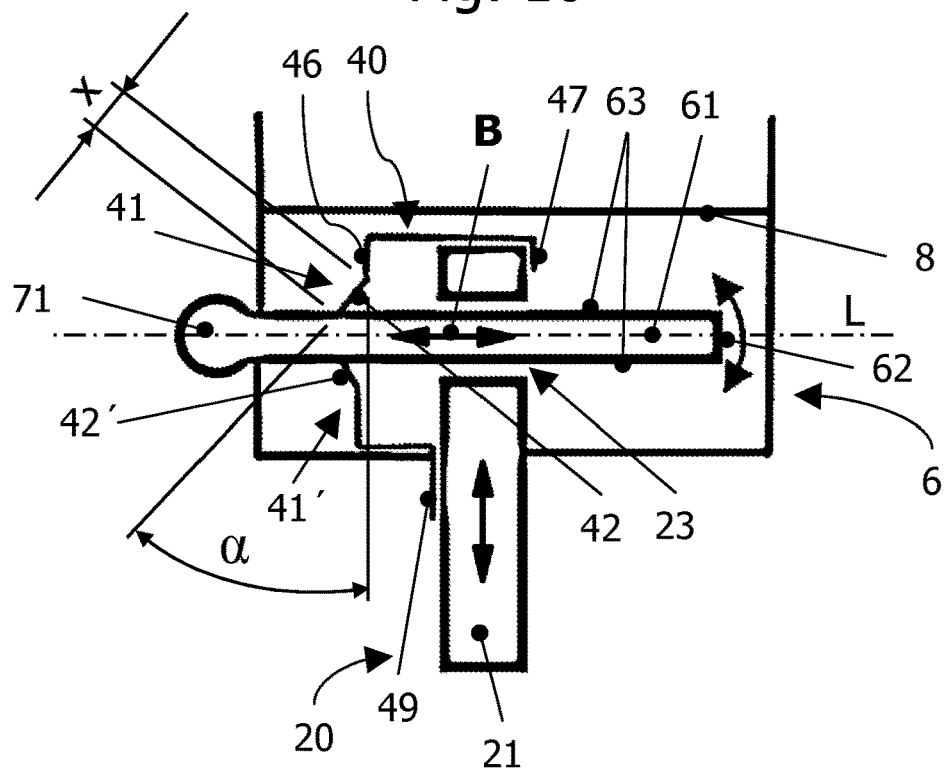
Figure 11:
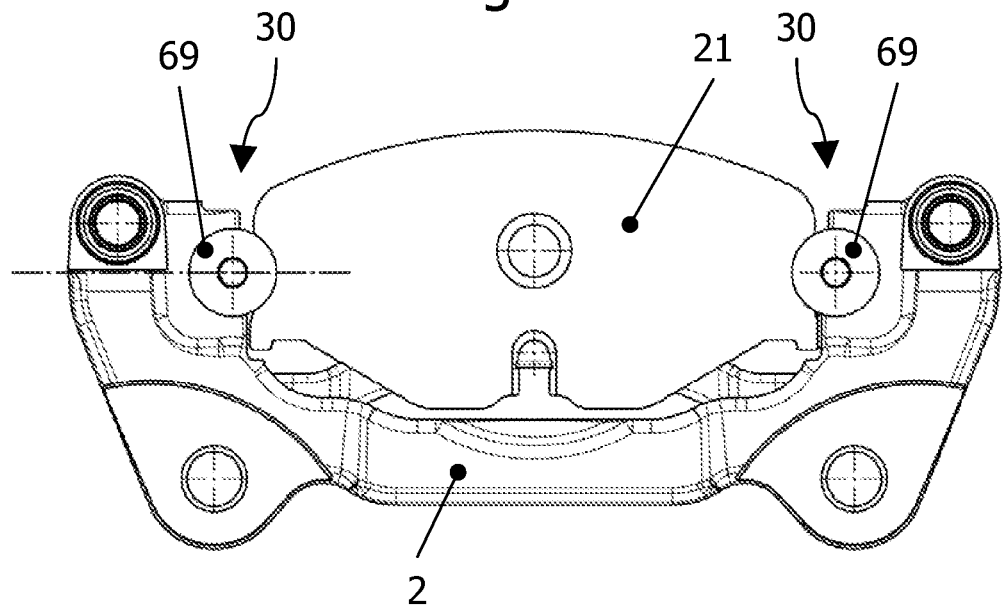
FIGS. 11 to 14 show an alternative exemplary embodiment of the disclosure.
Figure 12:
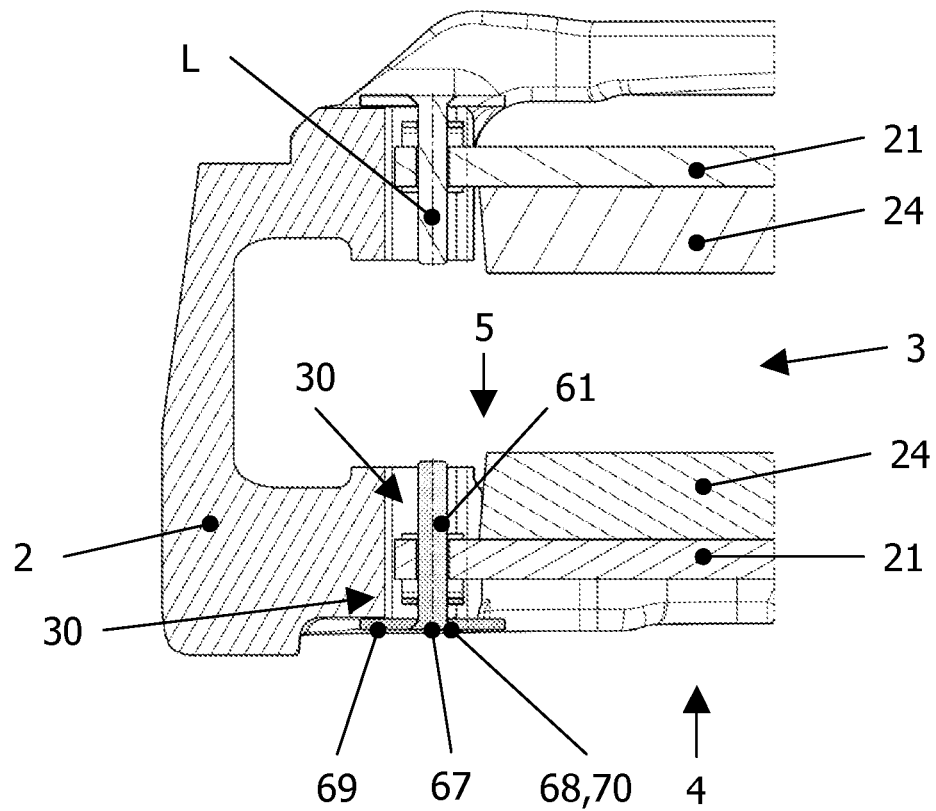
Figure 13:
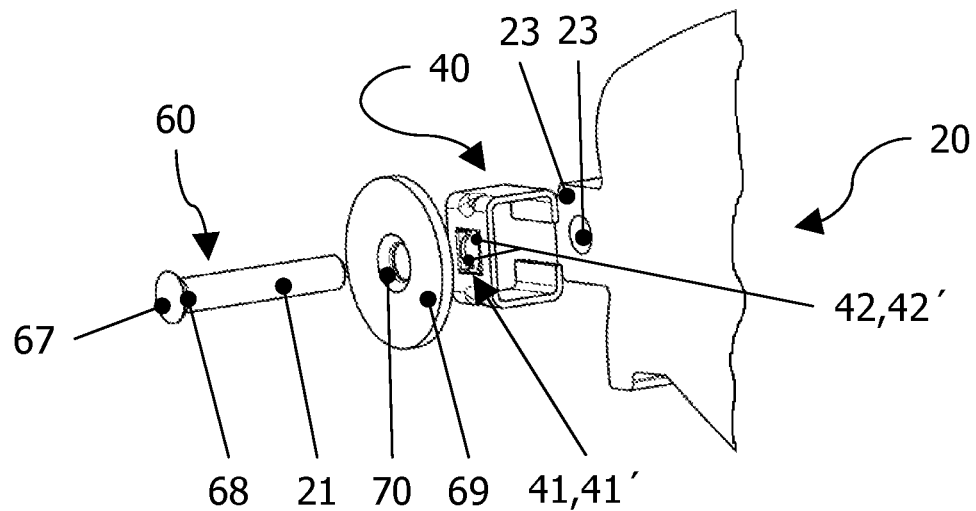
Figure 14:
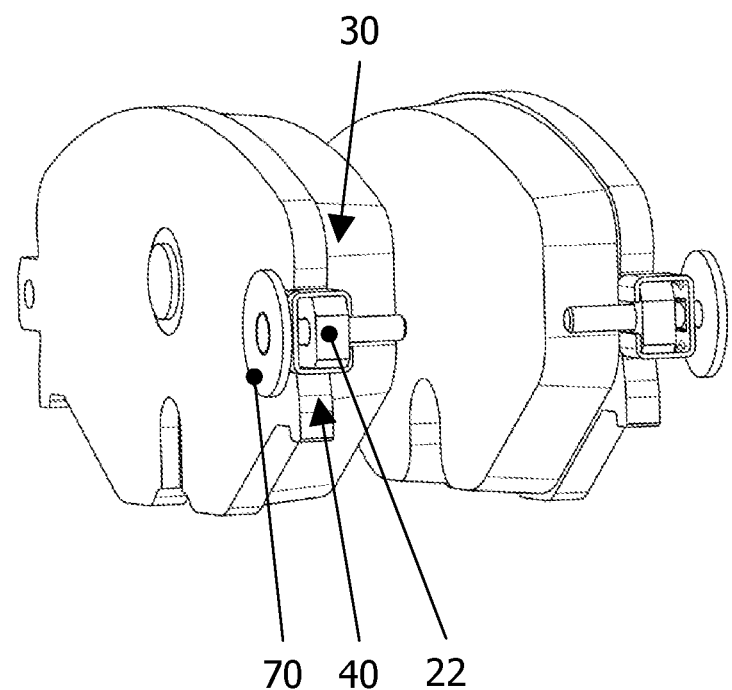

FIGS. 9 and 10 illustrate the mode of operation with highly schematic views of the disc brake arrangement 1 and, in particular, the positioning device 30. Due to the linear bearing and the two bearing regions by which the bearing rod 71 bears against the outer face 4 of the brake carrier 2, the guide 60 may follow inclinations of the outer face 4 and be securely supported thereagainst. If the outer face 4 is not oriented at right-angles to the actuating direction B, this results in an inclination of the guide rod 61 relative to the actuating direction B. Possible different inclinations of the guide 60 are identified in FIG. 9 with the curved double arrow. In spite of this inclination, the frictional connection between the guide rod 61 and the clamping elements 41, 41' is not interrupted. This is brought about by the straight edges 44 which bear unimpaired against the contact surfaces 63 of the guide rod or clamp the guide rod 61. The positioning device 30 compensates accordingly for different orientations or unevenness of the outer face 4 of the brake carrier 2.

In FIG. 10 the actuating device B is illustrated, amongst other things. It is also clearly visible here how the spring legs 42, 42' are deflected with a displacement of the brake lining 20. Since initially in the context of the restoring function the static friction between the clamping device 40 and the guide 60 is not overcome, the clamping edges 44 remain virtually suspended on the guide rod, whilst the brake lining 20 is moved and entrains the remainder of the clamping device 40. The spring legs 42, 42' are as a result elastically deflected and bring about a restoring action when the brake is no longer actuated and the brake lining 20 is able to move back. FIG. 10 also shows how the bearing rod 71 bears against the outer face 4 and forms a rotary bearing here. This rotary bearing may compensate for sideward movements of the brake lining 20 which are shown by the vertical double arrow, and bring about a pivoting movement of the guide rod 61 (see curved double arrow). The present frictional connection between the clamping device 40 and the guide 60 may also compensate for such a pivoting movement.

The alternative exemplary arrangement of the disclosure differs substantially by the bearing region 64 of the guide 60, the cross section of the guide rod 61 and the clamping elements 41, 41'. The mode of operation relative to the restoring and wear adjustment is in principle the same as in the first exemplary arrangement.

The bearing region 64 of the guide 60 is configured in the manner of a ball joint, by the guide rod 61 having instead at one end a bearing rod with a head 67 with a spherical bearing surface 68. The head 67 is mounted in a receiver 70 of a bearing disc 69 which is shaped so as to correspond to the spherical bearing surface 68. The bearing disc 69 bears against the outer face 4 of the brake carrier 2.

The clamping elements 41, 41' are now configured as cut-out elastically deflectable sheet metal portions 42, 42' which have rounded bearing edges. These bearing edges are clamped against a guide rod 61 with a circular profile. In this exemplary arrangement according to the disclosure the possible oblique positions of the guide rod already described above may also be compensated.

Figure 15:
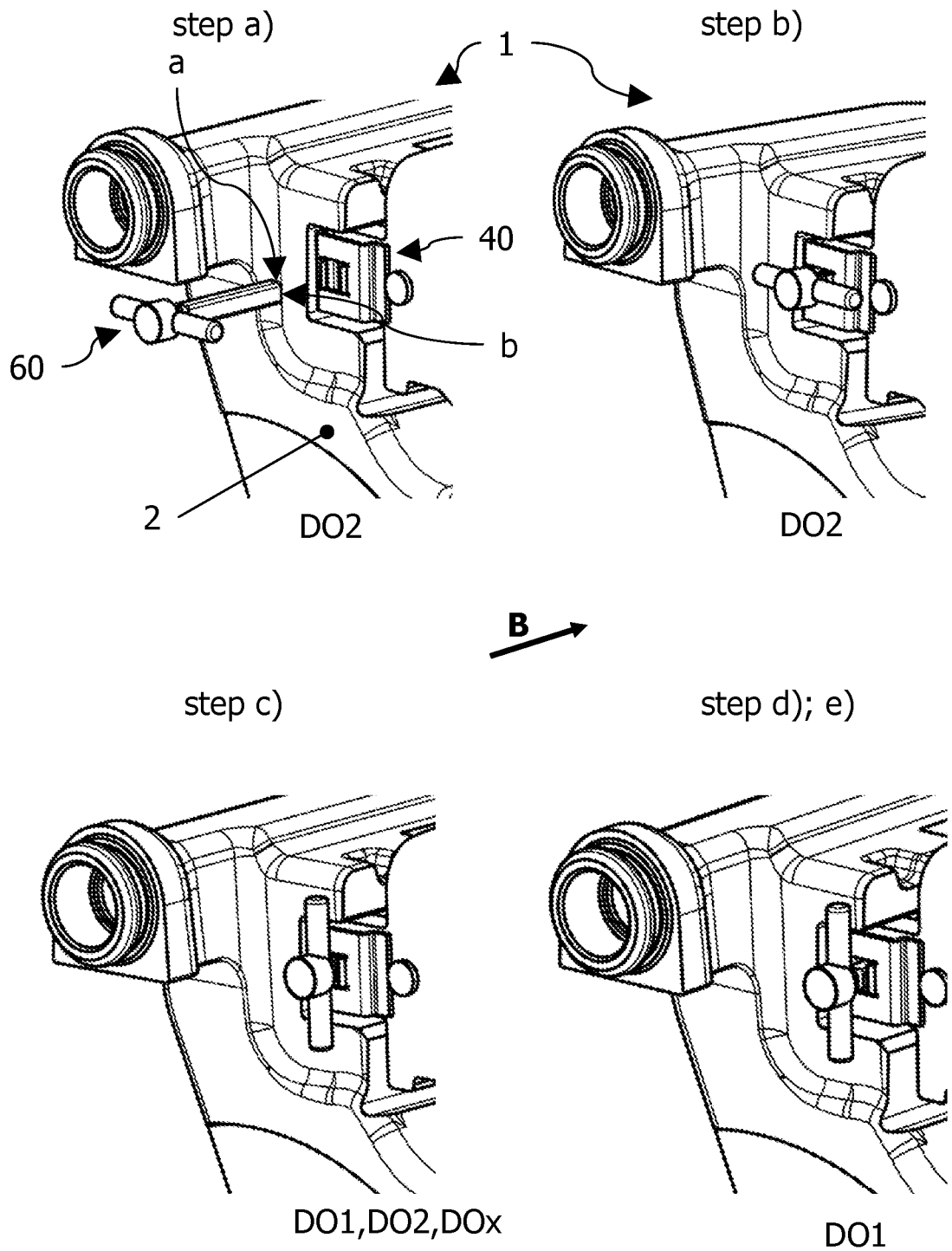
FIG. 15 illustrates mounting steps a) to e).

The mounting method according to the disclosure is described hereinafter with reference to the first exemplary arrangement of the disc brake arrangement:

FIG. 15 shows the method step a) in the first illustration. The brake lining 20 is provided with the clamping devices 40 and is displaceably mounted by guide ears 22 in the guide grooves 6 of the brake carrier 2. In this first mounting configuration, the guide 60 is oriented with the free end 62 of the guide rod 61 in the direction of the outer face 4 of the brake carrier 2. Moreover, the guide 60 is moved into the second rotational orientation DO2. This involves a rotation of the guide 60 about the longitudinal axis of the guide rod 61. In this second rotational orientation DO2, the long rectangular edges b of the guide rod 60 are oriented parallel to the support surface 8 of the corresponding guide groove 6.

The method step b) is shown in the second illustration. Due to the rotational orientation DO2 and that the guide rod 61 with its smaller cross-sectional extent a correspondingly opposes the opening width of the through-passage 45, the guide rod 61 is now pushed in a simple manner from the outer face 4 in the direction of the inner face 5 of the brake carrier 2 through the through-passage 45 of the clamping device 45, sufficiently far until the constriction 66 comes to rest in the region of the through-passage 45.

The method step c) is shown in the third illustration. The guide is rotated 90° about the guide rod longitudinal axis L in the rotational orientation DO1, so that the short rectangular sides a of the guide rod 61 are oriented parallel to the support surface 8 of the corresponding guide groove 6.

The method steps d) or e) are shown in the fourth illustration. In both cases the rotational orientation DO1 is maintained. In the case of the method step d) the guide 60 is pulled out slightly further counter to the above insertion direction until the clamping elements 41, 41 are pretensioned due to the bearing thereof against the short rectangular edges a. This pretensioning is produced since now the larger cross-sectional extent b of the guide rod takes up the opening width of the through-passage 45.

In the case of the method step e) the positioning of the clamping device 40 on the guide rod 61 takes place by the actuation of a brake in which the disc brake arrangement 1 is a constituent part after the installation thereof. By this method step, the clamping device 40 and thus also the brake lining are positioned such that this position corresponds to an operating position in which the brake lining 20 is in contact with a brake disc. At the same time the bearing rod 71 also comes to bear against the outer face 4 of the brake carrier 2 and is supported there at two bearing points.

The invention claimed is:
1. A disc brake arrangement comprising,
a brake carrier comprising a brake disc shaft, comprising at least one outer face which is a side remote from the brake disc shaft, comprising at least one inner face which is a side facing the brake disc shaft, and comprising guide grooves which run in each case from the outer face to the inner face, the direction thereof defining an actuating direction, and which are formed in each case from two opposing guide surfaces and a support surface connecting the guide surfaces,
at least one brake lining comprising a friction lining and a lining carrier which is displaceably mounted by guide ears in the guide grooves in the actuating direction and
at least one positioning device comprising a guide and comprising a clamping device, the at least one brake lining and the brake carrier being coupled thereby so as to be displaceable relative to one another,
wherein the clamping device has at least one protruding, elastically-acting clamping element which, due to the elastic deformation in an operating configuration of the positioning device, brings about both a frictional connection between the clamping device and the guide, which permits a wear adjustment and generates a restoring force when an actuating force is applied to the positioning devices,
wherein the guide has a guide rod and a bearing region, the guide being supported thereby on the brake carrier, and wherein the clamping device is connected to a guide ear of the lining carrier in such a manner that the position of the clamping device is fixed relative to the corresponding guide ear, and
wherein the guide rod has at least one planar contact surface, a straight edge of the at least one clamping element bearing thereagainst and forming therewith a linear contact.
2. The disc brake arrangement according to claim 1, wherein the clamping device is a sheet metal structure which is configured in one piece, and
wherein the at least one clamping element is an elastically deflectable sheet metal portion.
3. The disc brake arrangement according to claim 1, wherein the clamping device is a sheet metal structure which is configured in one piece, and
wherein the at least one clamping element comprises a folded sheet metal portion.
4. The disc brake arrangement according to claim 3, wherein a folded edge of the folded sheet metal portion relative to a base plate, from which the folded sheet metal portion is bent out, has a folding angle α of a size ranging from 20° to 70°.
5. The disc brake arrangement according to claim 3, wherein the sheet metal of the sheet metal construction has a sheet metal thickness, wherein a neutral axis of the folded edge has a length, measured from a transition from the base plate to the folded region,
wherein the measurement of the length is at least equal to a measurement of the sheet metal thickness and a maximum of 4 times the size of the measurement of the sheet metal thickness.
6. The disc brake arrangement according to claim 1, wherein the at least one clamping element bearing the straight edge against the guide in the operating configuration.
7. The disc brake arrangement according to claim 6, wherein the straight edge is oriented at an angle of 60° to 120°, to the actuating direction.
8. The disc brake arrangement according to claim 6, wherein the straight edge is oriented at right-angles to the actuating direction.
9. The disc brake arrangement according to claim 5, wherein the at least one clamping element has a straight edge, the at least one clamping element bearing thereby against the guide in the operating configuration.
10. The disc brake arrangement according to claim 3, wherein a folded edge of the folded sheet metal portion relative to a base plate, from which the folded sheet metal portion is bent out, has a folding angle of a size ranging from 30° to 60°.
11. The disc brake arrangement according to claim 3,
wherein the sheet metal of the sheet metal construction has a sheet metal thickness, wherein a neutral axis of the folded edge has a length, measured from a transition from the base plate to the folded region,
wherein the measurement of the length is at least equal to a measurement of the sheet metal thickness and a maximum of 3 times the size of the measurement of the sheet metal thickness.
12. A disc brake arrangement comprising,
a brake carrier comprising a brake disc shaft, comprising at least one outer face which is a side remote from the brake disc shaft, comprising at least one inner face which is a side facing the brake disc shaft, and comprising guide grooves which run in each case from the outer face to the inner face, the direction thereof defining an actuating direction, and which are formed in each case from two opposing guide surfaces and a support surface connecting the guide surfaces,
at least one brake lining comprising a friction lining and a lining carrier which is displaceably mounted by guide ears in the guide grooves in the actuating direction and
at least one positioning device comprising a guide and comprising a clamping device, the at least one brake lining and the brake carrier being coupled thereby so as to be displaceable relative to one another,
wherein the clamping device has at least one protruding, elastically-acting clamping element which, due to the elastic deformation in an operating configuration of the positioning device, brings about both a frictional connection between the clamping device and the guide, which permits a wear adjustment and generates a restoring force when an actuating force is applied to the positioning device,
wherein the guide has a guide rod and a bearing region, the guide being supported thereby on the brake carrier, and wherein the clamping device is connected to a guide ear of the lining carrier in such a manner that the position of the clamping device is fixed relative to the corresponding guide ear,
wherein the at least one clamping element is a first clamping element, wherein the clamping device comprises a second clamping element, which has the same features of the first clamping element,
wherein the first and second clamping elements form a through-passage for the guide rod, and
wherein a cross section of the guide rod is designed such that in the operating configuration of the positioning device the guide rod elastically pretensions the clamping elements in a first rotational orientation about its longitudinal axis, and in a first mounting configuration of the positioning device the guide rod does not pre- tension the clamping elements or to a lesser extent in a second rotational orientation about its longitudinal axis, in comparison with the operating configuration with the first rotational orientation.

13. The disc brake arrangement according to claim 12, wherein the guide rod has a constriction in a transition region to the bearing region, whereby in a second mounting configuration in which the clamping elements protrude into the constriction, the guide rod does not pretension the clamping elements or the guide rod pretensions the clamping elements to a lesser extent in comparison with the operating configuration, irrespective of its rotational orientation about its longitudinal axis.

14. The disc brake arrangement according to claim 12, wherein the guide rod has a rectangular cross section with short rectangular edges and long rectangular edges, and
wherein the two short rectangular edges form in each case the planar contact surface, wherein in the operating configuration the first and the second clamping elements bear in each case against one of the short rectangular edges.

15. The disc brake arrangement according to claim 14,
wherein the bearing region has a head with an at least partially spherical bearing surface,
wherein the head is mounted in a receiver of a bearing disc which is shaped so as to correspond to the at least partially spherical bearing surface and wherein the bearing disc bears against the outer face of the brake carrier.

16. A mounting method for mounting a positioning device in a disc brake arrangement according to claim 15 comprising the steps:
 a) orienting the guide with the free end of the guide rod in the direction of the outer face of the brake carrier and such that the long rectangular edges of the guide rod are oriented parallel to the support surface of one of the guide grooves,
 b) inserting the guide rod from the outer face in the direction of the inner face of the brake carrier through the through-passage of the clamping device until the constriction comes to rest in the region of the through-passage,
 c) rotating the guide about the guide rod longitudinal axis such that the short rectangular sides of the guide rod are oriented parallel to the support surface of the same guide groove,
 d) and/or,
 wherein the guide is pulled out counter to the previous insertion direction until the clamping elements are pretensioned by bearing against the short rectangular edges, and
 e) wherein a disc brake, in which the disc brake arrangement is a constituent part, is actuated for positioning the brake lining into an operating position, and the bearing region of the positioning device is brought to bear against the brake carrier.

17. The disc brake arrangement according to claim 14,
wherein the bearing region is configured as a bearing rod, which adjoins one end of the guide rod and at the same time forms a T-shape therewith, one piece,
wherein the bearing rod is oriented parallel to the short rectangular edges of the guide rod and
wherein in the operating configuration the bearing rod is also oriented at an angle of 0° to 30° to the support surface.

18. The disc brake arrangement according to claim 14,
wherein the bearing region is configured as a bearing rod, which adjoins one end of the guide rod and at the same time forms a T-shape therewith, in one piece,
wherein the bearing rod is oriented parallel to the short rectangular edges of the guide rod and
wherein in the operating configuration the bearing rod is also oriented parallel to the support surface.

\* \* \* \* \*